3,605,168
WINDSHIELD WIPER BLADE
John P. Moorhead, Valparaiso, and Leo J. Wubbe, Beverly Shores, Ind., assignors to The Anderson Company, Gary, Ind.
Filed Mar. 16, 1970, Ser. No. 19,923
Int. Cl. B60s 1/40; A47l 1/02
U.S. Cl. 15—250.42             23 Claims

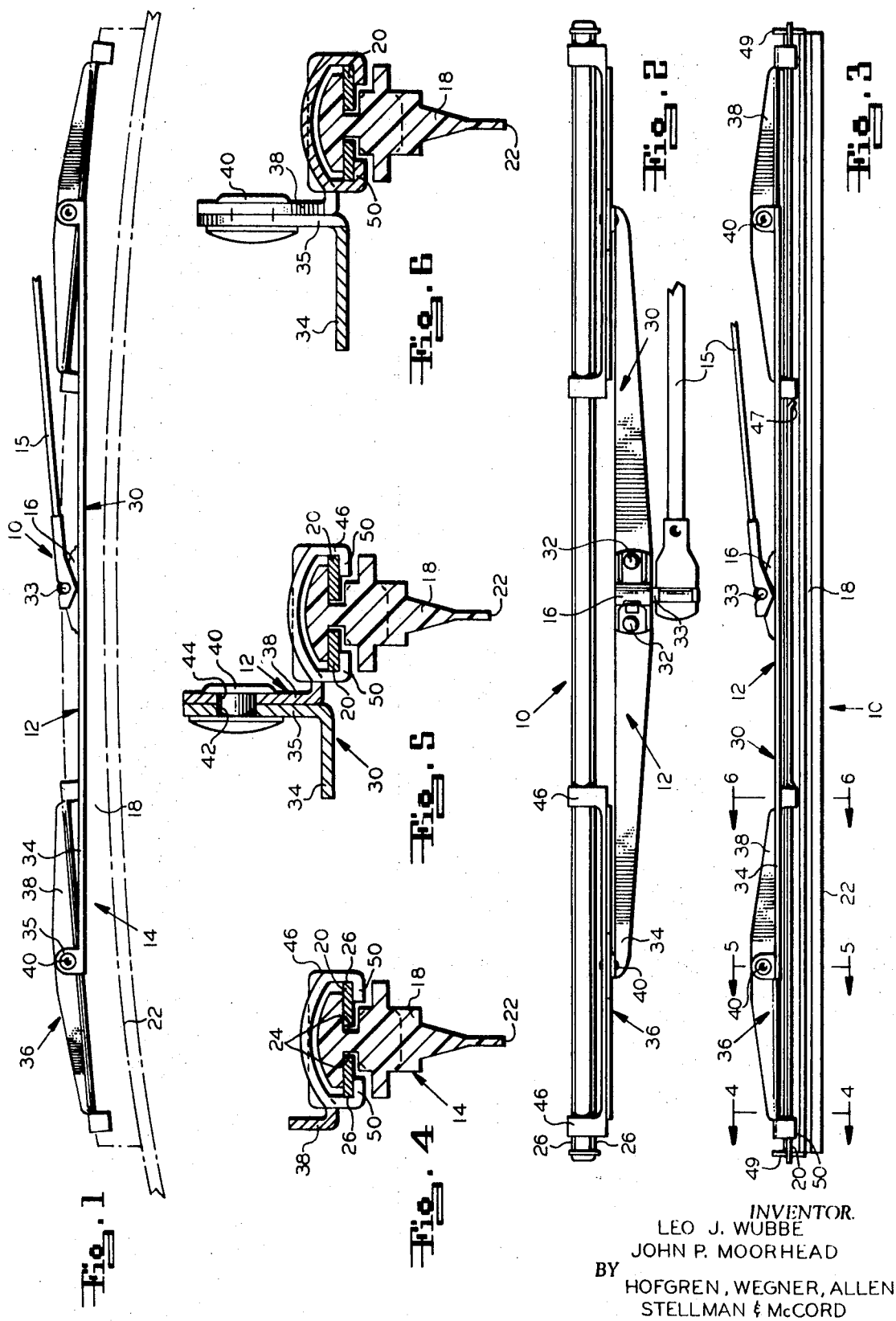

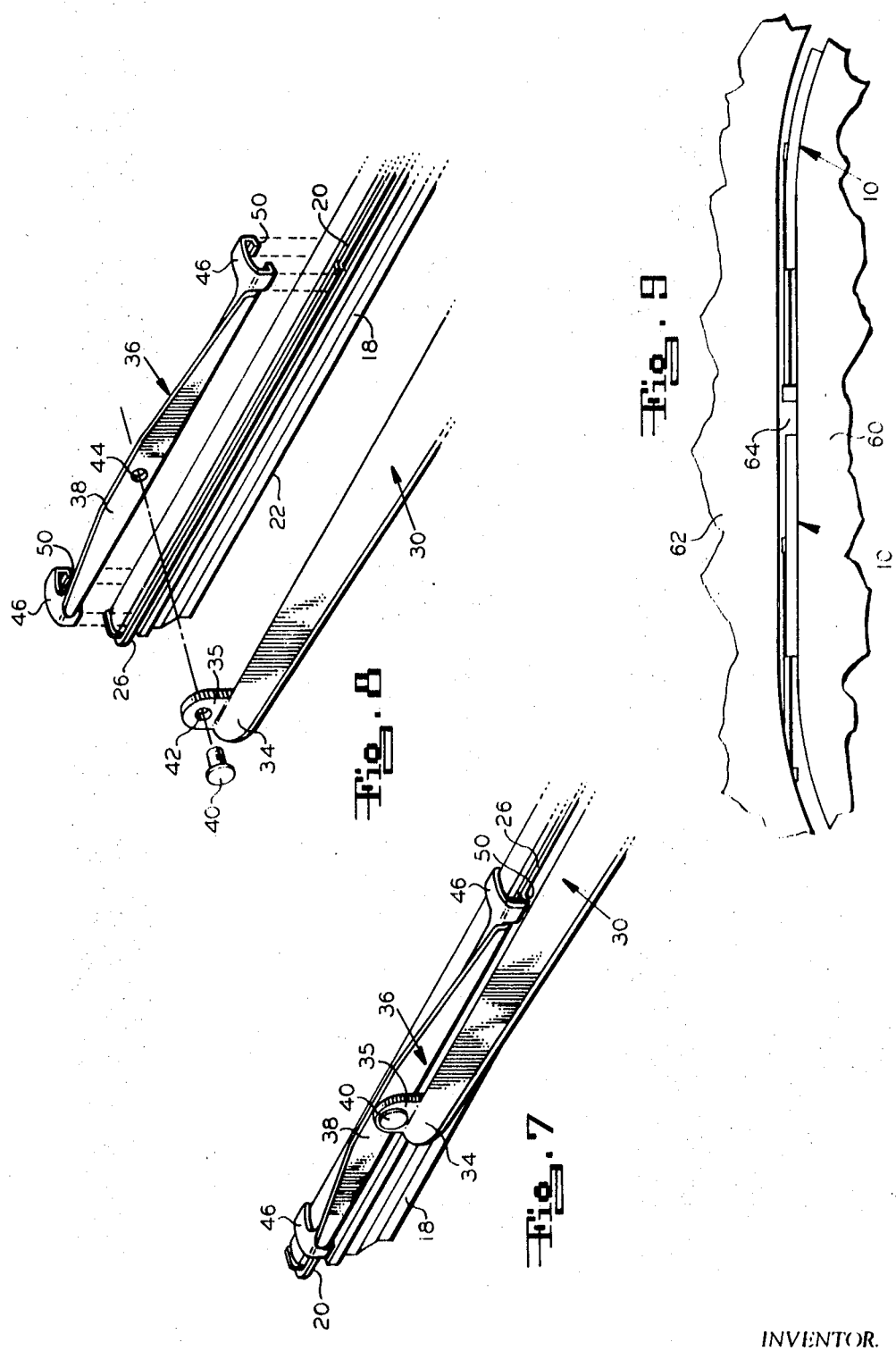

ABSTRACT OF THE DISCLOSURE

This invention relates to windshield wiper blade assemblies for wiping a curved or a flat windshield. The assembly includes a wiping element and a pressure distributing structure operatively connected together in such a way as to transmit pressure received by the pressure distributing structure from a wiper arm and to distribute said pressure along the length of the wiping element to conform the wiping element to the shape of the surface of the windshield for wiping same. A member or members of the pressure distributing structure is located laterally of the wiping element so as to reduce the height of the profile or silhouette of the structure, to minimize the effect of snow pack or ice pack on the wiper in wintry weather, and to reduce interference between each of the members of the structure and between such members and the wiping element during flexing of the wiper.

BACKGROUND OF THE INVENTION

Field of the invention

This invention relates to a windshield wiper blade assembly and more particularly to a wiper blade assembly having one or more laterally disposed members operatively connected to a wiping element for producing improved wiping of a windshield while lowering the vertical profile of the assembly and reducing interference between the movable members thereof.

DESCRIPTION OF THE PRIOR ART

Since the introduction in the 1940's of interconnected, multi-part pressure distributing assemblies for wiper blades of the type generally shown in John W. Anderson U.S. Pat. No. 2,596,063, such blade assemblies have been generally used throughout the automotive industry. These blade assemblies or wipers included a wiping element formed from an elongated rubber blade supported by a resiliently flexible backing strip, and further included a superstructure slidably attached to the wiping element and consisting of articulated parts so that pressure received from a wiper arm was transmitted through the superstructure to the wiping element for windshield surface conforming relationship. The pressure distributing members of the superstructure were stacked or superposed one on top of the other and were also located directly above the wiping element. Thus pressure from a wiper arm was transmitted from member to member of the superstructure and directly toward the back of the wiping element and through the wiping element to the surface to be cleaned.

Due to the stacking of members of the superstructure directly above the wiping element in its plane of flexure, the wiping element when extensively flexed would engage with the immediately contiguous elements of the superstructure to thereby limit the degree or amount of flexure of the wiping element. In one attempt to overcome this problem, the members of the superstructure were made more arcuate to allow for the full flexure of the wiping element; however, such increased arcuity raised the profile of the wiper blade to such an extent that it became potentially a visibility obstruction to a driver. The higher profile also tended in some instances to present a greater "sail" area so that air and wind currents during driving could more easily lift the blade off the windshield.

Another problem that developed from the stacked design of the wiper superstructure arose as a result of the overlapping relationship between the articulated elements in the supperstructure. That is, with one end portion of a primary yoke overlapping the intermediate portion of a secondary yoke of the superstructure, ice, snow and other solids accumulated therebetween, reducing or preventing relative movement between the yokes which prevented the blade from conforming to the windshield surface and caused inefficient or ineffective wiping of the surface. Attempts to overcome this problem have been made by encasing the superstructure in a rubber boot, by cutting out overlapping portions of the superstructure and by heating the blade, but all of these solutions are expensive and have proven to be less than satisfactory in use.

Recent models of automobiles have removed the windshield wiper blades from a parked position on the lower edge portion of the windshield and have recessed or hidden them in a compartment in or adjacent the cowl and below the lower edge portion of the windshield. In this parked position, the wipers are not only out of sight but also are out of the direct abuse caused by air currents sweeping over the parked blade, by freezing ice and packed snow, and by the deleterious effect of the heat of the sun. In order to best recess the blades in the smallest possible compartment, it is desirable to reduce the height of the blade profile or silhouette; however, with blades heretofore in use, such a profile reduction has limited the degree of flexure of the wiping element and hence limited its ability to conform to surface curvatures.

SUMMARY OF THE INVENTION

The wiper blade assembly of the present invention has a low vertical profile and articulated pressure distributing members which are interconnected and operatively located so as to eliminate vertical flexing interference with the wiping element. Furthermore, the number and extent of adjacent surfaces between members of the pressure distributing structure have been minimized so as to eliminate recesses which could clog up and reduce or prevent free relative movement between the members which in turn would prevent the wiping element from conforming to the surface to be wiped. More specifically, one or more members of the pressure distributing structure of the wiper blade assembly are laterally displaced relative to each other and relative to the wiping element of said assembly.

The primary member of the wiper blade pressure distributing structure receives pressure from the wiper arm and transmits said pressure to its respective ends. At least one end of the primary member is connected to a laterally displaced secondary member, which secondary member is likewise preferably laterally connected to the flexible wiping element such that pressure from the ends of the primary member is transmitted laterally to the secondary member which in turn transmits the pressure laterally to, and downwardly through, the wiper element for conforming the wiper element to the surface to be wiped. The secondary member does not overlie the wiper element except at the spaced apart pressure applying points or portions so that the wiper element is free to flex between the pressure applying portions during a wiping stroke without restriction or interference from the pressure distributing members. The primary member is connected laterally on either one side or the other of the secondary member such that there are no horizontal overlapping surfaces upon, or recesses within, which snow, ice and/or mud can pack to reduce or eliminate articulated motion between said primary and secondary members. It is preferred that the primary member be connected laterally of the wiping element and also of the secondary member or members.

The lateral displacement of the pressure distributing member or members relative to the wiping element makes it possible to lower the height of the profile or silhouette of the pressure distributing structure without restricting the flexing of the wiping element. The concept also permits orientation of the pivots or hinges between members of the pressure distributing structure so as to eliminate or reduce areas of overlap that form a basis for interference between the free articulation of relatively movable members thereof.

In addition, adjacent opposed faces or surfaces on each of the articulating pressure distributing members are considerably reduced in area which further minimizes the problems of snow pack or ice formations which tend to prevent pivoting or rocking at the connections between the members. Also, the position of these surfaces, and the plane of movement of each of the pressure distributing members, affords a "scissors" type action or movement which assists in assuring relative movement between the members even under icing and snow pack conditions. Furthermore, if the wiper of the present invention is subjected to icing or snow pack conditions, as when a vehicle may be left out-of-doors at night, the members of the pressure distributing structure can easily be manually broken loose from such restrictions and made again relatively movable for their intended purpose.

In the structure of the present invention, the lateral offset between the pressure distributing members has yet another advantage. Such a structure and concept lends itself particularly well to known plastic fabrication methods and techniques such that the entire pressure distributing structure can be formed of plastic material, and can preferably be formed in an integral, one-piece unit. It is, therefore, within the contemplation of the present invention that the entire pressure distributing structure be formed of plastic, and that each connection between an end of the primary member and one of the secondary members will afford a pivoting or rocking connection to redistribute the applied pressure from the end of the primary member to the ends of the secondary member and then downwardly to the flexing wiping element to provide surface conformance. Such a rockable connection may, by selection of plastic material of the desired physical characteristics and shape, rely upon the inherent resiliency of the plastic material, and/or in addition, a hinged integral plastic joint may be provided at the connection to afford the "scissors" type pivoted action between the pressure distributing members for surface conformance of the wiping element.

The details of construction and operation of the invention will now be more fully described and claimed, reference being had to the accompanyingg drawings forming a part hereof wherein like reference numerals refer to like parts through and in which—

In the drawings:

FIG. 1 is a side elevational view of our improved windshield wiper blade assembly in position on a windshield with the wiping element shown in phantom;

FIG. 2 is a top plan view of the wiper blade assembly of FIG. 1;

FIG. 3 is a side view in elevation of the wiper blade assembly;

FIG. 4 is a cross-sectional view taken along the line 4—4 of FIG. 3;

FIG. 5 is a cross-sectional view taken along the line 5—5 of FIG. 3;

FIG. 6 is a cross-sectional view taken along the line 6—6 of FIG. 3;

FIG. 7 is a partial perspective view of one end portion of the wiper blade assembly;

FIG. 8 is an exploded perspective view of the parts of the end portion of the wiper blade assembly of FIG. 7; and FIG. 9 is a view of a portion of a vehicle as viewed from above showing a lower portion of the windshield, a portion of the cowl of the vehicle and a pair of our improved wiper blade assemblies in parked position.

Referring to the drawing wherein similar reference numerals refer to similar parts throughout the several views, the numeral 10 designates the wiper or wiper blade assembly having an articulated pressure distributing structure 12 operatively connected at spaced points to a wiper means or wiping element 14. The structure 12 is adapted to be detachably connected to the end of a pressure applying wiper arm, generally designated 15, by means of the connector element 16 rigidly affixed to an intermediate portion of one member of the structure 12.

The wiper means or wiping element 14 is comprised of a resilient blade 18 and a flexible backing strip 20 carried by the resilient blade 18 in such a manner that the combined wiper means 14 is relatively freely flexible in the plane substantially perpendicular to the surface being wiped and is relatively stiff in the plane transverse to said first named plane. The resilient blade 18 can be extruded, molded or otherwise formed of rubber, plastic or similar materials having the desirable attributes of conforming to a surface under pressure, of wiping a surface clean when drawn or pushed thereacross, of maintaining desirable characteristics under extremes of temperature and of economy as a raw material and as processed for use. The resilient blade 18 is elongate in one dimension, is relatively thin in a direction perpendicular to the elongate dimension and is generally tapered in cross-section with the narrower part constituting the surface contacting wiping edge 22, as illusrated in FIGS. 4–6.

Means are provided in the thicker portion of the resilient blade 18 for receiving and maintaining in operative relationship the flexible backing strip 20. In FIG. 4, for example, of the illustrated version of the wiper means 14, the resilient blade 18 has a pair of oppositely facing continuous groves 24 formed in the lateral sides of the thickened portion thereof into which grooves are nested portions of the backing strip 20. The flexible backing strip 20, as illustrated, is an elongate strip of flexible material such as steel, plastic or the like. The strip as illustrated is flat and preferably rectangular in cross-section so as to be relatively flexible in one plane and relatively inflexible in the plane transverse thereto. The backing strip 20 may be in one piece with a slot bridging the longitudinal centerline or may be in two parts. In either version of the backing strip, the two sides or parts are nested or seated in the grooves 24 in the resilient blade 18 with the outer longitudinally extending edge portions 26 of the backing strip 20 facing laterally outwardly from the sides of said blade so as to support the resilient blade 18 for surface conforming flexure in a single plane during a wiping stroke. This plane of flexure is generally parallel to, but spaced laterally of, the planes of movement of the parts of the pressure distributing structure, as will be apparent from the subsequent description. Since the wiping element 14 and each of the members of the pressure distributing structure 12 are three-dimensional, it will be understood that the plane of flexure actually occurs within a three-dimensional zone and that the planes of movement or pivoting of each of the members of the pressure distributing structure also actually occurs within a three-dimensional zone.

The articulated pressure distributing structure 12 in the illustrated preferred form has a primary pressure applying member or primary yoke 30 to which is fastened, as by means of rivets or the like 32 (FIG. 2), the connector element 16 which is appropriately designed to receive and hold the end portion 33 of the wiper arm 15. The primary yoke 30 consists of a body portion formed of a relatively flat or slightly bow-shaped piece of material, preferably metal, and has at least at one end portion 34 an upstanding ear or flange 35 integrally formed along one edge of said primary yoke 30.

Secondary pressure applying members or secondary yokes 36 afford means for attaching the primary yoke to the wiper means 14, and each secondary yoke preferably has an upstanding elongate substantially rigid body portion 38 which is pivotally connected to the upstanding ear or flange 35 of the primary yoke 30 by a connecting means or pivot pin 40 passing (see FIGS. 5 and 8), respectively, through openings 42, 44 in said flange 35 and said body portion 38. The opposite ends of the body portion 38 have end portions shaped for attachment to wiper means 14, the end portions being in the form of laterally disposed pressure applying means 46, each of which has inturned ends forming claw means 50, each of which claw means 50 is adapted to slidably embrace and engage the outer edge portions 26 of the backing strips 20. Thus, downward pressure toward the windshield from the wiper arm 15 to the structure 12 will apply the downward pressure to the primary yoke 30 and to its opposite ends, then laterally through each of the pins 40 to the secondary yokes 36, and then laterally once more to the pressure applying means 46 and downwardly through the wiper means 14 toward the surface to be cleaned.

In the embodiment illustrated, downturned abutments 47 in the backing strip 20 are employed so that the claw means 50 have limited sliding movement with respect to the backing strip 20. If desired, manually removable abutments 49 may be positioned at the opposite ends of the wiping element 14 so that wiping element 14 can be replaced with another similar wiping element. Many various means are known for inserting and removing wiping elements 14 from wiper blade assemblies which specific means do not form any part of this invention.

Of particular importance in our invention is the lateral displacement or disposition of the primary yoke 30 relative to the secondary yoke 36. That is, with the primary yoke 30 laterally disposed relative to the secondary yoke 36, the primary yoke 30 is displaced laterally of the wiping element 14 such that the wiping element 14 is free to flex relative to the primary yoke 30 to an extent that its curature may pass that of the primary yoke 30, as is best shown in FIG. 1.

The nature of the pivot connections between flange 35 on the primary yoke 30 and body portion 38 of the secondary yoke 36 creates a scissors action therebetween in a vertical plane which avoids packing of snow and ice between the primary and secondary yokes. The scissors action between the primary and secondary yokes of our invention is relatively unobstructed in the vertical plane. Even if the small overlapping areas of the adjacent surfaces of flange 35 and body portion 38 become frozen together by the accumulation and freezing of water therebetween, they are easily broken loose with a small amount of pressure and thereafter the relative motion between the primary and secondary yokes can continue as before. With the primary yoke displaced laterally of the wiping element, the silhouette or vertical height of the wiper blade assembly when positioned on a windshield can be minimized. In other words, windshield wiper assemblies embodying the invention can be constructed so that the vertical distance from the windshield to the highest point on the primary yoke is never greater than the vertical distance to the highest point of either of the secondary yokes as shown in FIGS. 1 and 3, which feature is in marked contrast to wiper blade assemblies of the prior art. The superstructure can occupy some of the space that in normal construction would be occupied by the wiper element and thus will permit a lower silhouette than would otherwise be the case.

In addition, the optimized condition is created as shown in the drawings by laterally displacing the body portion 38 of the secondary yoke 36 relative to the wiping element 14 so that the space between the claws 50 of the secondary yoke 36 becomes unrestricted in the plane perpendicular to the windshield, thereby permitting more flexing of the wiping element 14 between said claws 50. Even with the lateral displacement of the body portion 38 of the secondary yoke 36, the pivot connection 40 between the primary and secondary yokes still provides a vertical plane of pivot and still has a scissors action eliminating snow packing between the primary and secondary yokes and permitting a low silhouete in the resulting wiper blade assembly. The lateral displacement of the body portion 38 of the secondary yokes 36 makes it possible to retain all of the advantages of the lateral displacement of the primary yoke and, in addition, permits a greater degree of flexibility of the wiping element 14 without interference from either the primary yoke 30 or the secondary yokes 36.

The secondary yoke 36 is an important element of our invention in that when laterally displaced no interfering structure of the body portion 38 of the secondary yoke 36 is overlapping the wiping element 14 as said wiping element is flexed throughout its total range. That is, when the body portion 38 of secondary yoke 36 is disposed laterally or sidewise with respect to the wiping element or wiper means 14 so that as the wiper means 14 rises and falls between the pressure applying means 46 the body portion 38 of secondary yoke 36 will not interfere with the flexing. With the secondary yoke 36 laterally disposed out of wiper means interfering relationship, the profile or vertical extent of the secondary yoke 36 can be reduced to a minimum since the wiper means 14 can flex upward between the pressure applying means 46 in overlapping relationship with the lower edge of the body portion 38 of the secondary yoke 36 without interference therewith.

The primary yoke 30, as shown, is relatively flat in one direction and is relatively flat or only slightly bowed in a direction transverse thereto. Although in the illustrated form the primary yoke 30 is shown laterally disposed away from the wiper means 14 and the secondary yoke 36, it is understood that for certain applications the primary yoke 30 may be pivotally connected to a laterally disposed body portion 38 of the secondary yoke 36 in such a way that the primary yoke 30 is overlapping the wiper means 14 but spaced sufficiently far from said means as to not interfere with the flexing of said wiper means 14. With the body portion 38 of the secondary yoke 36 laterally disposed with respect to the wiper means 14 and with the pivot means 40 between the secondary and primary yokes horizontally disposed between relatively small vertically oriented overlapping surfaces between said primary and secondary yokes, the possibility of ice packing therebetween is eliminated. That is, heretofore, the primary yoke had a horizontal extent overlapping a horizontal surface portion of the secondary yoke. Snow, ice and other foreign matter accumulated in the overlapping area prevent the two yokes from freely pivoting relative to each other and thereby restrict or eliminate proper transfer of pressure to the wiper means 14 which results in poor or inadequate wiping of the surface. The small vertically disposed overlapping adjacent areas or surfaces between the primary and secondary yokes eliminate any areas in which foreign matter can build up and interfere with proper wiping action of the blade.

FIG. 9 illustrates one particular application of our improved wiper blade assemblies. That is, the lower portion of a windshield 60 is shown in position in the body of the vehicle with the portion 62 of the hood adjacent the lower edge of the windshield being provided with elongate narrow opening 64 in which the wiper blade assemblies 10 are nested when said assemblies are not in use.

The importance of a low silhouette for a wiper blade assembly for use on present vehicles concerns the capability of such an assembly to be recessed when in parked position and not in use. The elongated opening 64, whether one continuous opening or separate openings, extends across the vehicle adjacent the lower edge of the windshield and is desirably made very narrow. In some instances, the design of the vehicle and its wiper equipment is such that in parked position, on one side of the windshield, the wiper element 18 is substantially straight as it rests in the opening 64 adjacent the lower edge portion of the windshield, while on the other side of the windshield, the wiper element assumes a considerable arc as it rests in the opening 64 adjacent an arcuate portion of the lower edge of the windshield. Whether in straight condition or in arcuate condition, it is necessary that the blade have a sufficiently low silhouete or profile as to pass through the narrow opening and into park position. The structure of the present invention is particularly well-adapted to meet the above conditions or demands of present day vehicle windshiled and cowl constructions.

Where the elongated opening 64 adjacent the hood is substantially straight, the offset primary yoke 30 can be made substantially straight, and its position with respect to the wiping element can be arranged so that its silhouette or profile is no higher than the height of the wiping element 18 itself and that part of the windshield where the windshield wiper enters in the recess and into hidden position. On the other hand, where the elongated opening across the windshield assumes an arcuate shape, the offset primary 30 can be made arcuate to conform to the arc of the wiping element 18 against the windshield at the position adjacent the arcuate opening into the recessed and parked position. The arc of the primary yoke 30 should be enough to assure that it will not scratch the windshield or interfere with the entry into the opening 64 in park position. Thus, again the arcuate primary has an exceedingly low silhouete at the critical position where the wiper blade enters through the arcuate opening into parked position. Again, the profile of the body portion of the arcuate primary can be made so that it is not significantly higher than the profile of the wiper element in its arcuate condition.

Thus, the present invention has the additional feature of being adaptable to form a low silhouete windshield wiper under conditions where the opening to parked position is straight and where the opening to parked position assumes varying degrees of arcuity.

As seen in FIG. 3, the primary yoke is in straight condition and lies closer to the surface to be wiped than the top portion of the wiping element.

As seen in FIG. 1, although the primary yoke is shown again in straight condition, it can be seen that an arcuate shape could be imparted to the primary yoke and the primary yoke would still be closer to the windshield to be wiped than the top portions of the wiping element.

The low silhouette characteristics of the laterally displaced primary and/or secondary yokes concept is readily adaptable to design concepts for improving anti-windlift characteristics, i.e., the yokes of the wiper blade assembly can be formed in aerodynamic shapes to reduce wind resistance and to take advantage of air flow principles for holding the body element in contact with the surface being wiped.

The inventive concept herein taught is intended to be applied to the prior art wiper blade assemblies having multi-part pressure distributing members which have been positioned in stacked relation one upon the other. That is, by laterally displacing one or more of the pressure distributing members relative to the wiping element, it is possible to eliminate snow pack between said members, to eliminate the flex interfering relationship of the pressure distributing structure to the wiping element, and at the same time to lower the profile of the wiper blade assembly. As an added result, the blades can be parked in a smaller compartment in hidden position along the lower edge of an automobile windshield.

We claim:

1. In a wiper for a windshield surface, the wiper having a wiping element which is supported for surface conforming flexure in a single plane during a wiping stroke, a pressure distributing structure for said wiping element, comprising: an elongated secondary pressure distributing member having its opposite end portions each formed for attachment at spaced portions to the wiping element adjacent one end portion and at an intermediate portion thereof so as to apply pressure at said spaced portions and through said wiping element toward the surface to be wiped; and an elongated primary pressure distributing member extending lengthwise adjacent said secondary pressure distributing member and being offset laterally therefrom, said primary member having one end afforded with means for attachment laterally to the other end portion of the wiping element, and an opposite end having a laterally extending connecting means engaging and making a rockable connection intermediate the end portions of said secondary pressure distributing member whereby pressure applied toward the windshield intermediate the ends of said primary pressure distributing member will be transferred laterally at each of said ends to said secondary pressure distributing member and to said wiping element, and then downwardly through said wiping element toward the surface to be wiped.

2. A pressure distributing structure as specified in claim 1, in which the means for attachment of the primary pressure distributing member to the wiping element is a second secondary elongated pressure distributing member having its opposite end portions each formed for attachment at spaced portions to the wiping element adjacent its other end portion and at a portion inwardly thereof, the primary pressure distributing member being offset laterally from said second secondary member and having a second laterally extending connecting means engaging and making a rockable connection intermediate the end portions of said second secondary pressure distributing member.

3. A pressure distributing structure as specified in claim 1, in which the highest points on the primary and secondary pressure distributing members when the wiper is positioned on the most curved portion of a windshield are each substantially the same distance from the windshield surface so as to present a wiper having a low silhouette.

4. A pressure distributing structure as specified in claim 1, in which the primary and secondary pressure distributing members have adjacent surfaces which are small in area and between which the lateral connecting means extends whereby frozen particles of water will have a minimum effect upon the rockable connection between said primary and secondary pressure distributing members.

5. A pressure distributing structure as specified in claim 1, in which the secondary pressure distributing member is laterally offset from the wiping element so that when the pressure distributing structure is attached to the wiping element, the wiping element is permitted to freely flex outwardly between the opposite end portions of said secondary member and between said secondary member and the means for attachment of said primary member without interference from said primary and secondary pressure distributing members.

6. A pressure distributing structure as specified in claim 1, in which the primary and secondary pressure distributing members have opposed adjacent surfaces laterally disposed with respect to each other, the lateral connecting means extending between said surfaces whereby during rocking movement between said primary and secondary members said opposed surfaces move in scissor-like fashion to free said members of frozen particles of water adhering therebetween.

7. A pressure distributing structure as specified in claim 1, in which the secondary pressure distributing member is laterally offset from the wiping element so that when the pressure distributing structure is attached to the wiping element, the wiping element is permitted to freely flex outwardly without interference between the opposite end portions of said secondary member, and the means for attachment of the primary pressure distributing member to the wiping element is a second secondary elongated pressure distributing member having its opposite end portions each formed for attachment at spaced portions to the wiping element adjacent its other end portion and at a portion inwardly thereof, the primary pressure distributing member being offset laterally from said second secondary member and having a second laterally extending connecting means engaging and making a rockable connection intermediate the end portions of the second secondary pressure distributing member.

8. A pressure distributing structure as specified in claim 7, in which the second secondary pressure distributing member is laterally offset from the wiping element so that when the pressure distributing structure is attached to the wiping element, the wiping element is permitted to freely flex outwardly without interference between the opposite end portions of said second secondary member.

9. A pressure distributing structure as specified in claim 7, in which the primary and secondary pressure distributing members have a first pair of opposed adjacent surfaces laterally disposed with respect to each other, and primary and second secondary pressure distributing members have a second pair of opposed adjacent surfaces laterally disposed with respect to each other, the lateral connecting means each extending between said surfaces to afford the rockable connections therewith, whereby during rocking movement of said three pressure distributing members said two pairs of opposed surfaces move in scissor-like fashion to free said members of frozen particles of water adhering therebetween.

10. A wiper for cleaning a windshield surface, comprising: an elongated wiping element supported for surface conforming flexure in a single plane during a wiping stroke; and pressure distributing means attached to the wiping element for limited relative longitudinal movement in respect thereto and adapted to receive a source of pressure and to distribute said pressure to the end portions and to at least one intermediate portion of the wiping element, said pressure distributing means including a pair of elongated pressure distributing members with one of said members being offset laterally from the wiping element and from the other of said members and making a laterally extending rockable connection with the other member whereby said source of pressure applied to said one member towards the windshield will be transferred laterally by the pressure distributing means toward the wiping element and then downwardly through the wiping element at said end portions and said intermediate portion.

11. A wiper for cleaning a windshield surface, comprising: an elongated wiping element supported for surface conforming flexure in a single plane during a wiping stroke; and pressure distributing means attached to the wiping element for limited relative longitudinal movement in respect thereto and adapted to receive a source of pressure and to distribute said pressure to the end portions and to an intermediate portion of the wiping element, said pressure distributing means including a pair of elongated pressure distributing members with one of said members being offset laterally from the wiping element and from the other of said members and having an end making a laterally extending rockable connection intermediate the ends of the other member whereby said source of pressure applied to said one member towards the windshield will be transferred laterally by the pressure distributing means toward the wiping element and then downwardly through the wiping element at said end portions and said intermediate portion.

12. A wiper for cleaning a windshield surface as specified in claim 11, in which said other of said pressure distributing member is positioned in respect to the wiping element so that a portion of said other member lies within the silhouette of the wiping element in all positions of said wiper on said windshield.

13. A wiper for cleaning a windshield surface as specified in claim 11, in which the pair of pressure distributing members has opposed adjacent surfaces and a laterally connecting means is provided to extend through said surfaces forming the rockable connection whereby during rocking movement between said pair of pressure distributing members said opposed surfaces move in scissor-like fashion to free said members of frozen particles of water adhering therebetween.

14. A wiper for cleaning a windshield surface as specified in claim 11, in which the other of the pressure distributing members is offset laterally from the wiping element so that the wiping element is permitted to freely flex outwardly without interference between each of the end portions and the intermediate portion from the pressure distributing members.

15. A wiper for cleaning a windshield surface, comprising: an elongated wiping element supported for surface conforming flexure in a single plane during a wiping stroke; a pair of secondary yokes arranged in end-to-end relation adjacent the wiping element and each having its ends attached thereto; a primary yoke extending lengthwise of the wiping element and being laterally offset from the wiping element and from the secondary yokes; and laterally extending connecting means at each end of said primary yoke for rockably joining each of the primary yoke ends intermediate the ends of a secondary yoke, whereby pressure applied toward the windshield intermediate the ends of the primary yoke will be transferred laterally at each of said primary yoke ends to the secondary yokes, and then downwardly through said wiping element toward the surface to be wiped.

16. A wiper for cleaning a windshield surface as specified in claim 15, in which the primary yoke is shaped in such manner and its connection to the secondary yokes is effected so that when the wiper is positioned on a windshield substantially the entire length of said primary member lies within the silhouette of the wiping element when the wiper is positioned against the windshield surface.

17. A wiper for cleaning a windshield surface as specified in claim 15, in which each of the secondary yokes is laterally offset in the same direction from the wiping element, the ends of each of the secondary yokes having lateral extensions for attachment to the wiping element so that the wiping element is permitted to freely flex outwardly without interference from the secondary yokes and primary yoke.

18. A wiper for cleaning a windshield surface as specified in claim 15, in which each of the laterally extending connecting means includes a pair of cooperating portions on the primary and secondary yokes, said portions having opposed adjacent surfaces and a laterally extending pivot member is provided for joining said portions to afford rockable movement between the yokes, whereby during rocking movement said opposed surfaces move in scissor-like fashion to free said members of frozen particles of water adhered therebetween.

19. A wiper for cleaning a windshield surface as specified in claim 15, in which the laterally extending connecting means includes an upturned ear at each end of the primary yoke, and each secondary yoke is provided with an intermediate body portion affording a surface positioned in opposed adjacent relation with one of said upturned ears, and a pivot member is provided rockably joining each ear to its respective secondary yoke, the primary yoke being otherwise substantially straight whereby when the wiper is positioned on a windshield, the vertical distance of the highest point on the primary yoke from the windshield is never greater than the vertical distance of the highest point of the secondary yokes from the windshield.

20. A wiper for cleaning a windshield surface, comprising: an elongated wiping element supported for surface conforming flexure in a single plane during a wiping stroke; and pressure distributing means attached to the wiping element for limited relative longitudinal movement in respect thereto and adapted to receive a source of pressure and to distribute said pressure to the end portions and to two intermediate portions of the wiping element, said pressure distributing means including three elongated pressure distributing members with one of said members being offset laterally from the wiping element and from the other two of said members, the opposite ends of said one member making a laterally extending rockable connection intermediate the ends of each of the other two members whereby said source of pressure applied to said one member towards the windshield will be transferred laterally to each of the other two members and toward the wiping element and then downwardly through the wiping element at said end portion and said two intermediate portions.

21. A wiper for cleaning a windshield surface, comprising: an elongated wiping element supported for surface conforming flexure in a single plane during a wiping stroke; and an articulated pressure distributing assembly adapted to receive pressure from a windshield wiper arm and distribute such pressure to said wiping element, said pressure distributing assembly having at least two pivotally articulated parts relatively movable in a pair of upright planes lying perpendicular to the axis of the pivot therebetween, said parts having laterally projecting means for engaging and connecting said parts with said wiping element at longitudinally spaced apart portions, said wiping element and said pressure distributing parts being positioned so that the plane of flexure of the wiping element during a wiping stroke and the pair of upright planes of movement of said parts are parallel to but spaced apart from each other.

22. A wiper for cleaning a windshield surface comprising: an elongated wiping element flexible for conforming to the surface to be wiped; and pressure distributing means attached to the wiping element and adapted to receive a source of pressure and to distribute said pressure to the end portions and to an intermediate portion of the wiping element, said pressure distributing means including a pair of elongated pressure distributing members with one of said members being offset laterally from the wiping element and from the other of said members and having an end making a laterally extending rockable connection intermediate the ends of the other member whereby said source of pressure applied to said one member toward the windshield will be transferred laterally by the pressure distributing means towards the wiping element and then downwardly through the wiping element to said end portions and said intermediate portion.

23. A windshield wiper means for a vehicle having a curved windshield, at least two windshield wiper blade assemblies reciprocably mounted for wiping portions of said windshield, recess means formed below and in alignment with the lower edge portion of said windshield, means for parking said windshield wiper blade assemblies in said recess means, at least one of said blade assemblies having a primary and a secondary yoke member, said primary yoke member being laterally disposed with respect to said secondary yoke member, and means joining said primary and secondary yoke memebrs for articulation of said yoke members relative to each other with no portion of said primary yoke overlapping any portion of said secondary yoke in a plane parallel to the windshield, said primary yoke being shaped relative to the curvature of the wiped portion of the surface of the windshield so as to present the blade assembly with the lowest silhouette possible when the blade assembly is in the parked position within said recess means.

References Cited

UNITED STATES PATENTS

| 2,852,796 | 9/1958 | Leins | 15—250.32X |
| 2,973,542 | 3/1961 | Horton | 15—250.35X |
| 3,147,506 | 9/1964 | Williams | 15—250.32 |
| 3,163,877 | 1/1965 | Wubbe | 15—250.32 |
| 3,378,874 | 4/1968 | Scinta | 15—250.42 |
| 3,440,679 | 4/1969 | Druseikis | 15—250.35X |
| 3,453,679 | 7/1969 | Thorlakson | 15—250.16 |

PETER FELDMAN, Primary Examiner